Dec. 23, 1930.  W. W. VOSPER  1,785,884
PIPE VISE
Filed Oct. 3, 1927
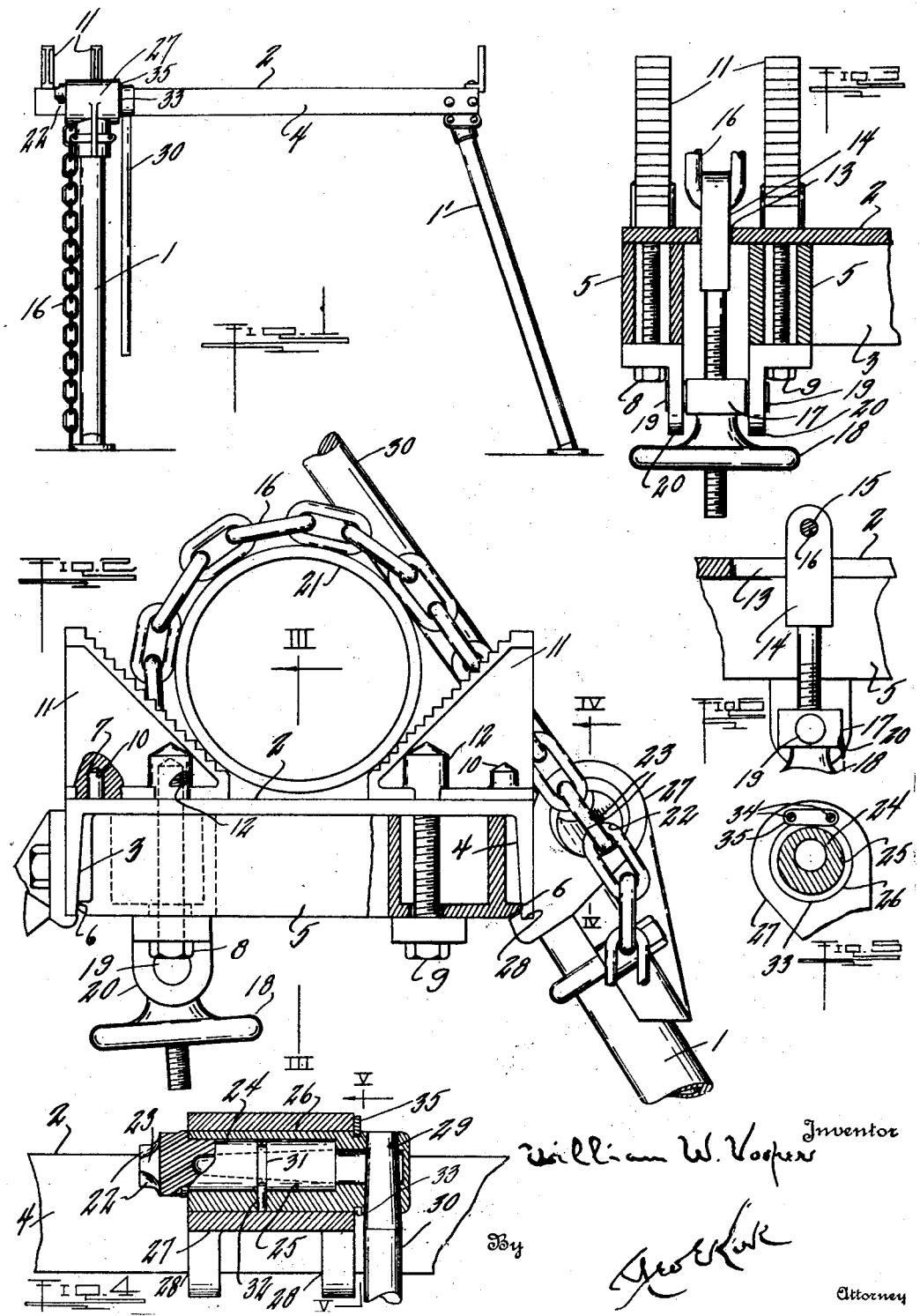

Patented Dec. 23, 1930

1,785,884

UNITED STATES PATENT OFFICE

WILLIAM W. VOSPER, OF TOLEDO, OHIO, ASSIGNOR TO THE TOLEDO PIPE THREADING MACHINE COMPANY, OF TOLEDO, OHIO, A CORPORATION OF OHIO

PIPE VISE

Application filed October 3, 1927. Serial No. 223,626.

This invention relates to gripping and clamping apparatus.

This invention has utility when incorporated in anchoring against rotation of pipe, especially for cutting, threading, or assembling operations thereon.

Referring to the drawings:

Fig. 1 is a side elevation of an embodiment of the invention as a pipe vise;

Fig. 2 is a fragmentary view from the left of Fig. 1;

Fig. 3 is a section on the line III—III, Fig. 2;

Fig. 4 is a section on the line IV—IV, Fig. 2;

Fig. 5 is a section on the line V—V, Fig. 4; and

Fig. 6 is a fragmentary side view of the eye bolt and its mounting.

Legs 1, 1', are shown as sustaining a support comprising web 2 and side flanges 3, 4. The web 2 and side flanges 3, 4, together constitute a support or table as sustained by the legs 1. This web portion 2, between the flanges 3, 4, is provided with open work reinforcements 5. These reinforcements 5 are preferably anchored by welds 6 into fixed position with the support proper 2, 3, 4.

The support 2, at the regions of these reinforcements 5, is provided with dowel pins 7 and bolts 8, 9. The pins 7 extend into seats 10 of jaws 11. Additionally these jaws 11 have seats 12 into which the bolts 8, 9, extend with threaded engagement for positioning the jaws against shifting as to the support 2. The jaws 11 are shown in adjacent pairs, opposing each other, with clearance therebetween.

Adjacent the bolts 8, the support 2 has opening 13 through which extends bolt 14 having eye 15 upwardly therefrom engaging terminal link or chain 16. This eye bolt 14, 15, as extending through the opening 13, passes through rocking yoke or washer 17 to be engaged by nut-forming hand wheel 18. This washer 17 has trunnions 19 extending into brackets 20, anchored by the bolts 8. There is thus formed in the assembly of this chain 16 with the support 2, 3, 4, 5, an adjustable rocking anchor. The washer 17 may rock to allow the chain 16 to take a desired direction about the object as mounted in the vise.

In adapting this structure to large size pipe, one and one-quarter (1¼) inch chain may be used with the range of pipe say from four and one-half (4½) inches to twelve (12) inches in diameter. The free end of the chain rising from the eye bolt 14, 15, passing upward through the opening 13, may wrap about pipe 21 and a link of the chain may be inserted in seat 22 between the cheeks 23. From these cheeks 23 there is cylindrical extension 24 entering eccentric bearing 25 in barrel or cylindrical member 26. (Fig. 4.)

This member 26 is rotatably mounted in main bearing 27, anchored by welding 28 with flange 4 of the support. This anchoring is in the vicinity of a reinforcement 5. The barrel 26 carries tapered diametrically extending opening 29 into which may be thrust radially extending bar 30 as an operating lever.

In the assembly of this take-up device for the free end of the chain, the cylindrical extension 24 from the chain link engaging seat 22, is provided with groove 31 thereabout into which may be thrust pin 32 before the barrel 26 is inserted in the bearing 27. With the assembly of the seat and barrel in the bearing 27, the pin 32 is held from removal. This barrel 26, adjacent the end of the bearing 27 remote from the seat 22 is provided with groove 33. Screws 34 (Fig. 5) may anchor plate 35 in position with the bearing 27 and this plate, coacting with the groove 33, thereby forms a detachable assembly for this take-up or gripping effecting device.

In the region of eccentricity shown, the bar 30 may be in depending position when a link of the chain 16 is inserted in the seat 22. If the slack in the chain 16, at the particular link range, be rather excessive, hand wheel 18 may be operated to reduce such slack. Then by swinging the lever 30 upward toward the object 21, an effective gripping of the pipe 21 results. Should the adjustment be such that the lever or bar 30 may not be swung up fully and it is desired to swing such clear to the pipe 21, the hand wheel 18 may be slacked off a little, with the bar 30 down, and then the bar swung up. The location of the legs 1' directly to oppose any wear or strain of the gripping operation is a feature of stability and strength against distortion.

The device of this disclosure is one wherein a light weight, simple device may bring about an effective holding action against rotation. The adjustments are of a considerable range, and may be quickly taken. The elements are simple and of a degree of strength adequate for even pipe of great size relative to the device. The gripping action may be taken quickly and as quickly released, the latter occurring by merely swinging the arm or lever 30 downward or oppositely to the gripping direction.

What is claimed and it is desired to secure by Letters Patent is:

1. A bench type support embodying a channel, a reinforcement in the channel, jaws opposing the reinforcement and carried by the support on the opposite side of the channel from the reinforcement, a chain anchored with the reinforcement and having a free end extending therefrom to pass about an object for clamping the object toward the jaws, said free end being connectable to the support, and means for shortening the effective length of the chain for effecting clamping of the object toward the jaws.

2. A bench type support embodying a channel, reinforcements in the channel, four jaws, anchoring means assembling the reinforcement with the jaws and positioning the jaws in two opposing pairs with the channel of the support opposite thereto, and a chain clamp coacting with the support, said clamp including a lever having a chain engaging fulcrum rockable with the lever for clamping an object in said jaws.

3. A bench type support embodying a channel, reinforcements, two pairs of jaws, anchoring means assembling the reinforcements with the jaws for positioning the jaws with the support, an eye bolt anchored with said reinforcements, and a chain clamp having a free end extending from the eye bolt to pass about an object for clamping the object toward the jaws, and adjusting means for shortening the effective length of the chain, said means including a lever having a chain engaging fulcrum rockable with the lever for effecting clamping of the object toward the jaws.

4. A bench type support embodying a channel, reinforcements, two pairs of jaws opposing the reinforcements, anchoring means for positioning the jaws with the support, an adjustable rockably mounted eye bolt anchored with said reinforcements, a chain clamp having a free end extending from the eye bolt to pass about an object, a chain anchoring seat for the chain free end, a barrel in which the seat is freely rotatable and eccentric of which barrel the seat is mounted, and a lever mounted on said barrel as a fulcrum.

5. A chain vise take-up comprising a chain seat having a cylindrical extension transversely of the chain direction as determined by the chain seat, a cylindrical barrel in which said extension is freely rotatable and eccentrically mounted, a bearing for the barrel, and a bar for locking said barrel in the bearing.

6. A chain vise comprising jaw means, a bench type support for sustaining the means, an operator for the vise including a rock shaft, a sustaining leg for the support, and a mounting for the shaft fixed with said leg.

7. A chain vise comprising jaw means, a chain, anchoring means for an end of the chain with said jaw means, and a sustaining leg for the jaw means including a bracket assembling the leg with the jaw means and having a take-up bearing for the vise chain.

In witness whereof I affix my signature.

WILLIAM W. VOSPER.